United States Patent [19]

DeBard

[11] 4,053,086
[45] Oct. 11, 1977

[54] PUMPS FOR HAND-HELD DISPENSERS

[75] Inventor: Andre DeBard, Buc, France

[73] Assignee: Aerosol Inventions & Development S.A. Aid SA, Switzerland

[21] Appl. No.: 672,320

[22] Filed: Mar. 31, 1976

[51] Int. Cl.² .......................................... B67D 83/14
[52] U.S. Cl. .................................. 222/182; 222/341
[58] Field of Search ............ 222/341, 182, 383, 384, 222/385, 402.13, 334; 137/533.11, 539; 239/333

[56] References Cited

U.S. PATENT DOCUMENTS 2,873,892  2/1959  Nelson et al. ................. 222/341 X Primary Examiner—Stanley H. Tollberg
Attorney, Agent, or Firm—Holman & Stern

[57] ABSTRACT

A manually-operated, reciprocating pump for liquids comprising a pump body with a slidable piston, the piston being manually moved in one direction by a manually-operated actuating member and is resiliently-returned by a spring; the delivery stroke of the piston is disengaged from the actuating member during the return stroke so that the discharge is independent of the movement of the actuating member.

9 Claims, 7 Drawing Figures

FIG. 4
FIG. 5
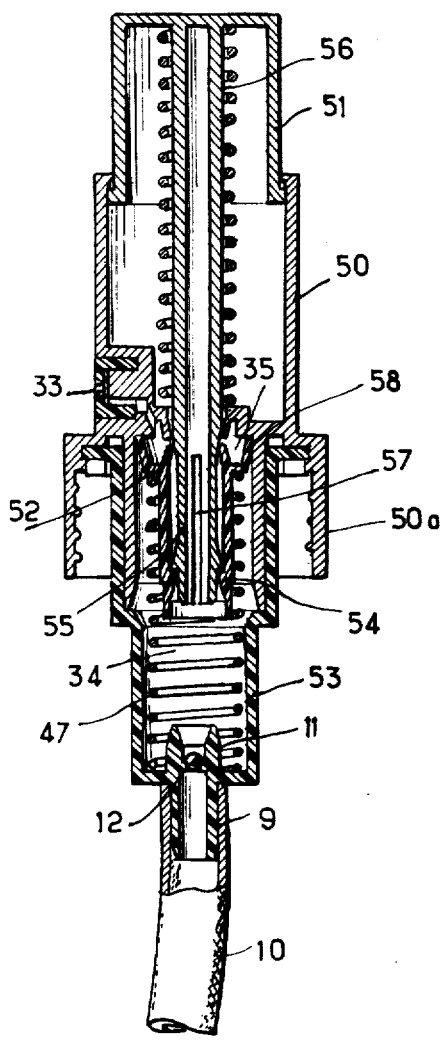
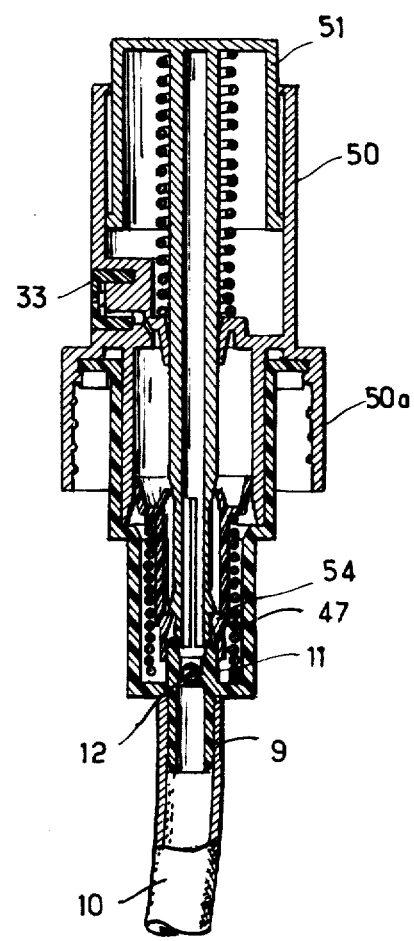

PUMPS FOR HAND-HELD DISPENSERS

FIELD OF THE INVENTION

The present invention relates to a manually-operated pump for liquids, intended primarily, but not exclusively, for spraying liquids such as toilet preparations, lotions and other liquids employed in the cosmetic and pharmaceutical industries.

BACKGROUND OF THE INVENTION

Pumps are already known, having a movable piston defining a chamber of variable volume inside a pump body and actuating means formed by a push button which reciprocates the piston to increase the volume of the chamber whilst it is put in communication with a body of liquid and then to reduce the volume of the chamber whilst it is put in communication with the atmosphere, generally through of a spray nozzle. These are the respective phases of intake and discharge of the liquid. Generally the piston is moved manually in one direction away from the rest position and a return spring ensures its return to the rest position.

The known pumps have the drawback that the discharge of the liquid is dependent on gentleness or otherwise of the action of the user. This results in a lack of efficiency of the pump, in particular a poor quality of the spraying of the liquid because the behaviour of the spray nozzle is closely related to the discharge pressure.

SUMMARY OF THE INVENTION

The aim of the invention is to reduce the drawbacks of the known pumps, in particular to ensure that the liquid is discharged under a finite minimum pressure, independent of the speed of operation by the user.

According to the invention we provide a manually operated reciprocating pump for liquids comprising a pump body with a piston slidable in, the piston being moved in one direction by a manually engaged actuating member and in the return direction by resilient return means such as a spring, in which the delivery stroke of the piston is this return stroke and in which the piston is disengaged from the actuating member during the return stroke so that the discharge is independent of the movement of the actuating member.

Thus, in the pump according to the invention, the discharge pressure is obtained not directly by the user's hand but by the return means (such as a spring) which is automatically released at the end of the travel of the actuating member by which the user preloaded the return means.

The actuating member may be connected to the piston by resiliently releasable means which are automatically released at or near the end of the movement in the said one direction, for example by stationary releasing means on the pump body. These releasing means may be formed by an inclined surface on the pump body that deflects laterally one or more tongues forming the said resiliently releasable means.

The invention will now be more fully described by way of example, described with reference to the accompanying drawings which show three embodiments and in which:

BRIEF DESCRIPTION OF THE FIGURES OF THE DRAWING

FIGS. 4, 5 and 6 are transverse sections showing a second embodiment of a pump according to the invention and illustrating its operation in the same positons respectively as FIGS. 1, 2 and 3.

DESCRIPTION OF PREFERRED EMBODIMENTS

Figure 1:
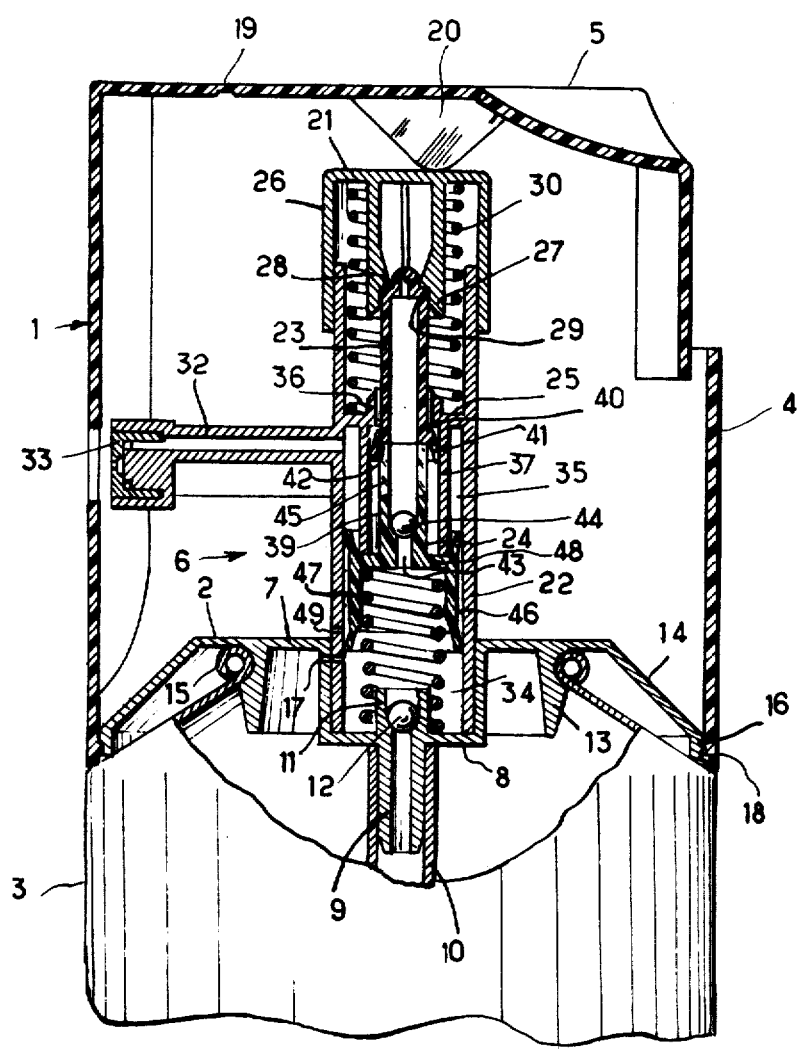
FIG. 1 is a transverse section through a spraying head equipped with a pump according to the present invention, shown in its rest position.
Figure 2:
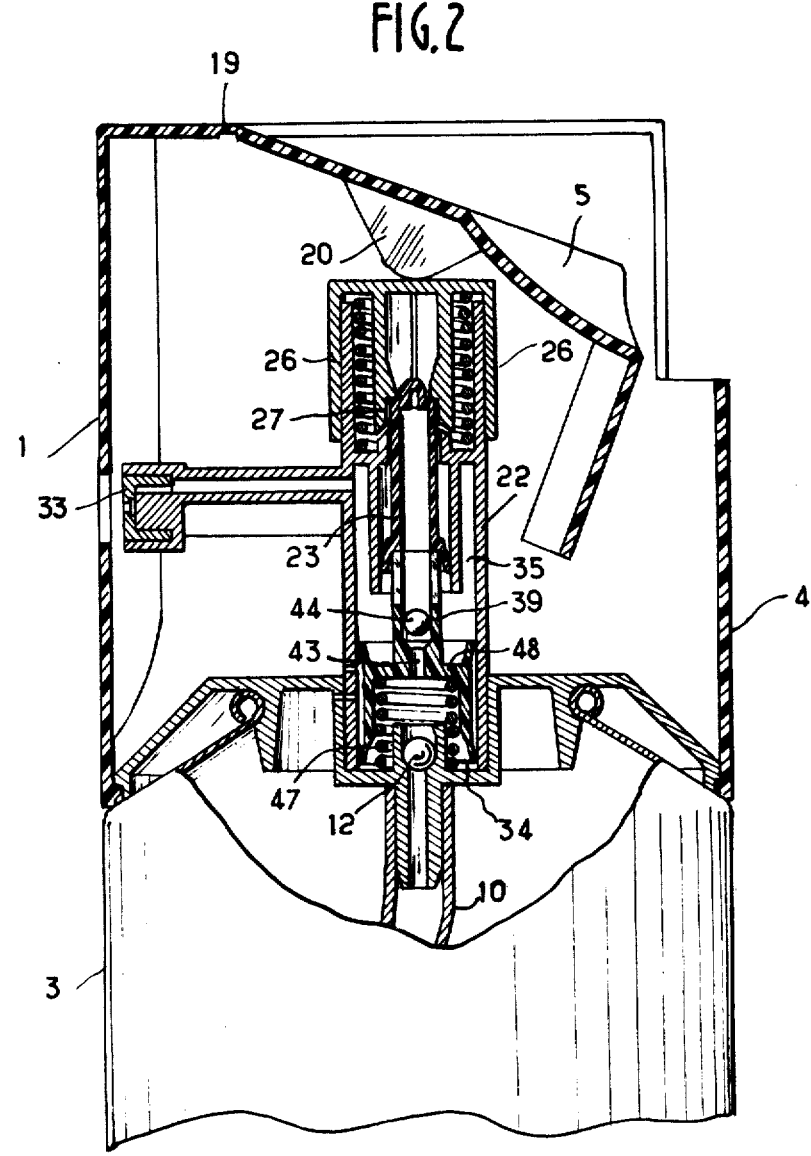
FIg. 2 is a similar transverse section showing the pump of FIG. 1 with the piston displaced to its lowest position.
Figure 3:
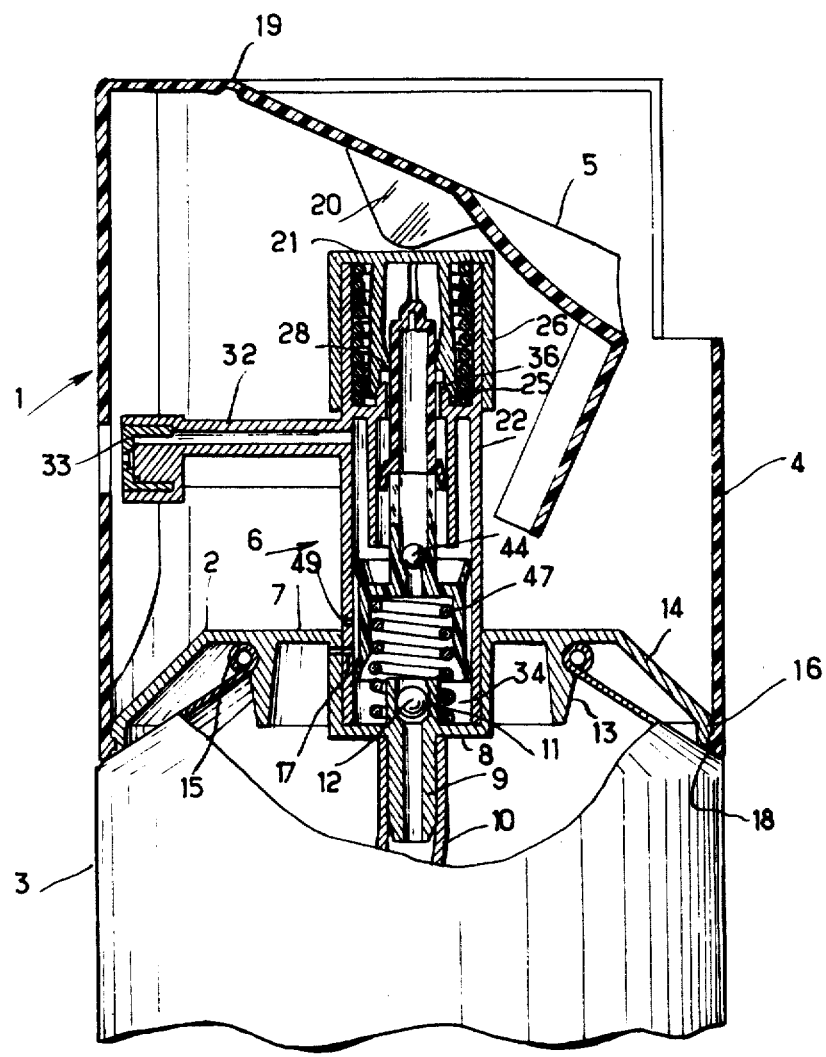
FIG. 3 is a transverse section similar to those of FIGS. 1 and 2 but showing the pump in its operative or spraying position.

The pump shown in FIGS. 1, 2 and 3 is mounted in a spraying head indicated generally by the reference numeral 1. An adaptor 2 which carries the pump is mounted in a known manner by snap engagement on the neck 15 of a liquid container 3. A cap 4 is mounted on the adaptor 2.

The pump is indicated generally by the reference numeral 6. It comprises primarily a piston 23-24 which is movable in a cylindrical pump body 22 and divides the interior of that body into an intake chamber 34 and a compression chamber 35.

The adaptor 2 incorporates a cup-shaped portion with a flat base 8 which has on its axis a tubular extension 9 onto which is forced a dip tube 10 mounted in the container. This tubular extension, which forms an intake port for liquid into the intake chamber, is extended upwards above the floor 8 by a cylindrical skirt 11 which is of reduced size to form a cup and receive a ball 12 which acts as a non-return valve. The cup-shaped portion 8 is joined externally at its upper end to an annular flat portion 7 joined to two downwardly-directed co-axial skirts 13 and 14. The inner skirt 13 is aligned with the inner surface of the neck 15 of the container 3 and is secured to this neck in a known manner by snap action thanks to a bead on its external surface, and the outer frusto-conical skirt 14 is supported on the container and has at its lateral periphery an annular outwardly directed bead 16 which allows snap engagement by the cap 4.

The cap 4 has a cylindrical skirt supported on the frusto-conical upper portion of the container 3 and has at its internal periphery a circular rib 18 which comes to engage under the rib 16 on the adaptor 2 to allow the location of the cap and its snap-engagement on the adaptor. The top of the cap forms a button 5 hinged at 19 by a portion of reduced thickness to the wall of the cap and pivoting when manual pressure is applied to that end of it which is opposite its hinge point. A boss 20 on this button engages a cap 21 forming the button member by which the pump 6 is actuated by displacement of the piston downwards in the pump body 22. This piston is made up of two parts, namely a main lower part 24, and an upper part 23.

The button 21 has two co-axial cylindrical skirts. The outer skirt 26 has an internal diameter at least equal to the external diameter of the pump body 22 and slides freely on this body 22. The inner skirt forms an extension of the cap co-axial with the piston. Having a diameter greater than that of the upper part 23 of the piston, it is split by longitudinal slits to form at least two tongues 27, each of which has near its lower end an internal arcuate rib 28 defined by a frusto-conical surface and a radial shoulder 29 against which the upper part 23 of the piston normally engages. At their lower ends the tongues 27 terminate in an outwardly divergent chamfered portion. The resilience of the tongues 27 is such that they are able to flex radially outwards to allow the piston to enter the cap. An upper return spring 30 acts upwards on the cap 21 and its lower end abuts against a transverse partition 25 in the pump body 22.

Below this partition the pump body 22 is connected to a passage 32 which puts the compression chamber 35 in communication with the atmosphere and which terminates in a nozzle 33 of the swirl type, known in itself, which breaks up into fine droplets the liquid discharged through the passage 32 to atmosphere. The partition 25 in the pump body has on its upper face a cylindrical extension 36 which embraces the upper part 23 of the piston and terminates in a convergently tapering tip. At its lower face it is extended by an annular sleeve 37, against the lower end of which the lower part 24 of the piston abuts and seals in the rest position of the latter. At the lower end of its upper part 23 of the piston there is an annular resilient lip 41 which seals against the sleeve 37 during movement of the piston and thus defines the compression chamber.

The upper portion 23 of the piston has the general shape of a hollow cylindrical tube closed at its upper end, where it has externally an annular shoulder co-operating with the shoulder 29 on the tongues 27, around a domed central portion. At its lower end it has an external shoulder 40 which, on the return stroke of the piston, engages the lower face of the partition 25 and it also has an internal shoulder 42, inside the sealing lip 41, by which the upper part 23 of the piston fits onto the lower part 24.

The main part of the piston, which is the lower part 24, has a tubular extension 39 of the same section as the upper part 23 and communicating with it. This extension also communicates with the intake chamber 34 through a passage 43 forming a valve seat designed to receive an upper ball valve 44. In addition it is laterally pierced by openings 45 which allow the liquid in the intake chamber to pass to the compression chamber when the passage 43 in the piston is not closed by the upper valve. The flat annular transverse portion 48, through which the passage 43 passes, is joined to an upwardly and downwardly extending skirt 46 terminating at its two ends in annular resilient lips which seal the piston in the pump body 22. Openings 17 and 49 through the pump body allow "venting" by entry of air into the container to replace the liquid discharge.

The piston itself, independently of its connection to the actuating button, is urged resiliently upwards, until its upper end engages the sleeve 37, by means of a lower return spring 47 which abuts on the one hand against the base 8 of the adaptor and on the other hand againt the lower face of the flat portion 48 of the piston.

The operation of the pump described above is explained below.

In its rest position, shown in FIG. 1, the piston and the cap 21 that forms the button are in their upper limiting positions under the action of the two springs 30 and 47. The compression chamber 35 is cut off from the discharge passage 32 by the engagement of the piston against the sleeve 37. When pressure is exercised on the button 5 the tongues 27, engaging the piston through the shoulder 29, cause the piston to be displaced downwards. The chamber 34 decreases in volume and the ball 12 engages its seating whilst the ball 44 is lifted, thus putting the intake chamber 34 and the compression chamber 35 into communication. When the button 21 reaches or nearly reaches the end of its travel (FIG. 2), the tongues 27 are displaced laterally apart by the tapered upper end of the extension 36 (FIG. 3) to release the piston from the button and the spring 47 pushes the piston in an upward direction. This return movement of the piston causes an increase in the volume of the intake chamber 34 at the expense of that of the compression chamber 35. The upper valve closes, liquid is drawn from the container into the chamber 34 through the lower valve, which is opened, and the liquid which has been able to pass from the chamber 34 into the compression chamber 35 in the preceding phase of operation is discharged to atmosphere through the nozzle 33. The return of the piston is effected by the spring 47 before that of the button or cap 21, which itself returns to the rest position when manual pressure on the button 5 is relieved. The tongues 27 automatically re-engage the upper part 23 of the piston to re-connect the piston to the button.

Figure 6:
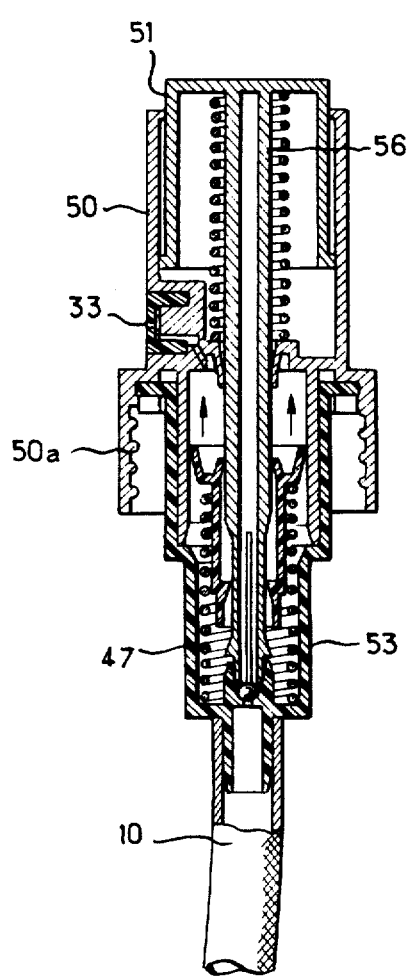

We now refer to FIGS. 4, 5 and 6 which show a modification of the pump according to the invention of which we will describe only those elements which differ significantly from those of the first embodiment.

A cap 50 which is screwed directly onto the container by a skirt 50a serves to guide a push button 51 and a piston 52. It constitutes the pump body with an adaptor 53 to which it is joined and which has at its lower end the same shape as that in the first embodiment above except that the upper end of the cylindrical wall 11 around the opening of the lower valve (ball 12) terminates in a divergently tapered funnel-like portion that forms the means to effect the release of the piston at the end of its downward travel. This release is effected by the funnel-like portion squeezing together the tongues 57 formed in the lower extension 55 of a hollow stem 56 lying on the axis of the button 51 and joined to the latter. The tongues 57 have an external shoulder which, in its normal position, engages an internal shoulder 54 on the piston.

The piston 52 which divides the interior of the pump body and separates the compression chamber 35 from the intake chamber 34, has an external lip 58 for sealing to the pump body and an internal lip 59. The latter seals onto the stem 56 of the button when the piston, released from the button, returns alone to its upper position under the action of the lower spring 47 (FIG. 6). But the extension 55 has an external diameter which is less than that of the remainder of the hollow stem 56, so that when the piston is moving with the button 51 (FIG. 5), the internal lip 59 is just out of contact with the extension, thus putting the intake chamber and the compression chamber into communication. Thus the lip 59 forms the equivalent of the upper non-return valve 44 of the first embodiment.

Figure 7:
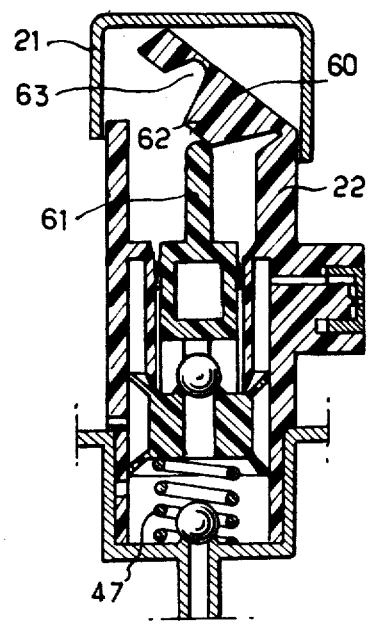
FIG. 7 shows a third embodiment of the pump according to the present invention.

The third embodiment, shown diagrammatically in FIG. 7, is closer to the one above than to that of FIGS. 1 to 3. It is altogether of simpler construction and differs in respect of the means for releasing the piston at the end of the travel of the button. These means comprise a lever 60 hinged on the pump body 22 and of which the end opposite the hinge follows in both senses the vertical displacement of the push button cap 21. On its lower face this lever has a guide cam for vertically displacing the piston by being in engagement with the upper end of a stem 61 connected to the piston. This cam has a projection 62 which causes the displacement of the piston, so that it moves with the button, against the action of the spring 47 during manual downward displacement of the push button cap. It has at its end a recess 63 which the stem 61 enters suddenly at the end of the travel of the button. The depth of this recess is such that it allows the piston to return alone to its rest position under the action of the lower spring 47, independently of the return of the lever and the cap. The return of the lever and cap when the user releases his pressure on the cap may be effected by an upper coil spring (not shown) like the spring 30 of the earlier embodiments, or possibly by the resilience of the hinge by which the lever 60 is connected to the pump body.

What is claimed is:

1. A manually-operated reciprocating pump for liquids comprising a pump body with a piston slidable therein, resilient return means operatively connected to the piston for moving the piston in one direction, an actuating member connected to the piston through resiliently-releasable means during movement of said piston in the said one direction, and releasing means mounted on the pump body engagable by said resiliently-releasable means adjacent the end of the travel of the actuating member in the said one direction, to release the resiliently-releasable means, thereby disengaging the piston from the actuating member, and allowing the return of the piston under the action of said resilient-return means.

2. A pump according to claim 1 in which the resiliently releasable means connecting the piston to the actuating member comprises at least one resilient tongue on one of those members engaging a shoulder on the other member and in which the release means comprises a stationary surface on the pump body inclined to the direction of travel of the actuating member and piston and acting to deflect the tongue laterally.

3. A pump according to claim 2 in which an extension of the piston extends through a stationary partition in the pump body to engage the actuating member through the medium of the said resilient tongue and in which the releasing means are mounted on the partition.

4. A pump according to claim 1 in which the pump body defines an intake chamber and a discharge chamber separated by the piston, the intake chamber being connected through a non-return valve to an intake port and the discharge chamber being connected through a discharge passage to atmosphere, and in which valve means allow liquid to pass from the intake chamber to the discharge chamber during movement of the piston in the said one direction but prevent flow in the reverse direction on the return stroke.

5. A pump according to claim 4 in which the valve means comprise a non-return valve in a passage through the piston.

6. A pump according to claim 4 in which the piston has an axial extension comprising at least one resilient tongue for engaging a shoulder on the piston during movement in the said one direction, and the pump body comprises releasing means engaged by said resilient tongue at or near the end of the travel of the actuating member in the said one direction, said releasing means comprising a stationary surface on the pump body inclined to the direction of travel of the actuating member and piston and acting to deflect the tongue laterally and thereby release the piston from the actuating member.

7. A pump according to claim 6 in which the actuating member is at the opposite end of the pump body from the intake port and in which an extension of the actuating member extends axially through the piston and has the resiliently releasable means at its end, the releasing means being mounted on the pump body in the neighbourhood of the intake port.

8. A pump according to claim 1 in which the actuating member has a cam through which it acts on the piston this cam having a projection that engages a portion of the piston on the movement in the said one direction and a recess into which the said portion enters near the end of that movement, thereby disengaging the piston from the actuating member.

9. A pump according to claim 1 including separate resilient return means acting on the actuating member to return it to a rest position independently of the piston.

* * * * *